(12) United States Patent
Posselius et al.

(10) Patent No.: US 10,479,354 B2
(45) Date of Patent: Nov. 19, 2019

(54) OBSTACLE DETECTION SYSTEM FOR A WORK VEHICLE

(71) Applicants: CNH Industrial America LLC, New Holland, PA (US); Autonomous Solutions, Inc., Mendon, UT (US)

(72) Inventors: John Henry Posselius, Ephrata, PA (US); Christopher Alan Foster, Mohnton, PA (US); Taylor Chad Bybee, Logan, UT (US); Bret Todd Turpin, Wellsville, UT (US); Michael G. Hornberger, Weston, ID (US)

(73) Assignees: CNH Industrial America LLC, New Holland, PA (US); Autonomous Solutions, Inc., Mendon, UT (US)

( * ) Notice: Subject to any disclaimer, the term of this patent is extended or adjusted under 35 U.S.C. 154(b) by 190 days.

(21) Appl. No.: 15/584,999

(22) Filed: May 2, 2017

(65) Prior Publication Data
US 2018/0319392 A1 Nov. 8, 2018

(51) Int. Cl.
*B60W 30/09* (2012.01)
*B60W 10/20* (2006.01)
(Continued)

(52) U.S. Cl.
CPC ............ *B60W 30/09* (2013.01); *B60W 10/04* (2013.01); *B60W 10/20* (2013.01); *E02F 9/2045* (2013.01);
(Continued)

(58) Field of Classification Search
CPC .............. B60W 30/09; B60W 30/095; B60W 30/0953; E02F 9/205; E02F 9/2045
See application file for complete search history.

(56) References Cited

U.S. PATENT DOCUMENTS 6,437,688 B1   8/2002 Kobayashi
6,615,137 B2   9/2003 Lutter et al.
(Continued)

FOREIGN PATENT DOCUMENTS

JP   WO-2015147149 A1 * 10/2015 ........... G05D 1/0242

OTHER PUBLICATIONS

JP WO-2015147149-A1 , Aoki Hideaki, 2015 (Translation—English) (Year: 2015).*
(Continued)

*Primary Examiner* — Anne M Antonucci
*Assistant Examiner* — Renee LaRose
(74) *Attorney, Agent, or Firm* — Rebecca L. Henkel; Rickard K. DeMille

(57) ABSTRACT

An obstacle detection system includes a controller configured to receive a first signal from a first sensor assembly indicative of presence of an obstacle within a field of view of the first sensor assembly. The controller is configured to receive a second signal from a second sensor assembly indicative of a position of the obstacle within a field of view of the second sensor assembly in response to presence of a movable object coupled to the work vehicle within the field of view of the first sensor assembly. The controller is configured to determine presence of the obstacle within the field of view of the first sensor assembly based on the position of the obstacle, and the controller is configured to output a third signal indicative of detection of the obstacle in response to presence of the obstacle within the field of view of the first sensor assembly.

20 Claims, 6 Drawing Sheets

(51) Int. Cl.
   *B60W 10/04* (2006.01)
   *E02F 9/20* (2006.01)
   *E02F 9/24* (2006.01)
   *E02F 9/26* (2006.01)
   *E02F 3/34* (2006.01)

(52) U.S. Cl.
   CPC .............. *E02F 9/24* (2013.01); *E02F 9/262* (2013.01); *B60W 2300/17* (2013.01); *B60W 2300/44* (2013.01); *B60W 2420/52* (2013.01); *B60W 2420/54* (2013.01); *B60W 2710/20* (2013.01); *B60W 2720/10* (2013.01); *E02F 3/3414* (2013.01)

(56) References Cited

U.S. PATENT DOCUMENTS

| | | | |
|---|---|---|---|
| 7,102,496 | B1 | 9/2006 | Ernst, Jr. et al. |
| 7,994,902 | B2 | 8/2011 | Avery et al. |
| 8,467,928 | B2 | 6/2013 | Anderson |
| 8,594,923 | B2 | 11/2013 | Wong et al. |
| 8,639,408 | B2 | 1/2014 | Anderson |
| 8,660,734 | B2 | 2/2014 | Zhu et al. |
| 8,874,281 | B2 | 10/2014 | Kolodgie et al. |
| 9,261,882 | B2 | 2/2016 | Kim et al. |
| 2015/0254986 | A1 | 9/2015 | Fairfield et al. |
| 2017/0120800 | A1* | 5/2017 | Linan .................. B60Q 1/08 |

OTHER PUBLICATIONS

Ren et al., "Distributed Multi-Vehicle Coordinated Control Via Local Information Exchange," Nov. 8, 2006, pp. 1002-1033, vol. 17, Issue 10-11, International Journal of Robust and Nonlinear Control.

Wang et al., "Multiple Vehicle Bayesian-Based Domain Search with Intermittent Information Sharing," Proceedings of the American Control Conference, Aug. 2011, IEEE.

Zhang et al., "Multiple Vehicle Cooperative Localization with Spatial Registration Based on a Probability Hypothesis Density Filter," Jan. 8, 2014, 12 pgs, MDPI, Basel, Switzerland.

Sayer, "Mapping Firm Invites Auto Industry to Improve Spec for Sharing Vehicle Sensor Data," Jun. 29, 2016, CIO News.

* cited by examiner

OBSTACLE DETECTION SYSTEM FOR A WORK VEHICLE

BACKGROUND

The disclosure relates generally to an obstacle detection system for a work vehicle.

Certain autonomous work vehicles include an obstacle detection system configured to detect obstacles that may encounter the work vehicle (e.g., due to movement of the work vehicle and/or movement of the obstacle). Upon detection of the obstacle, the obstacle detection system may inform an operator of the presence and, in certain configurations, the location of the detected obstacle. The operator may then instruct the autonomous work vehicle to avoid the obstacle. In certain configurations, the obstacle detection system may automatically instruct a movement control system of the autonomous work vehicle to avoid the obstacle (e.g., by instructing the movement control system to stop the autonomous work vehicle, by instructing the movement control system to turn the autonomous work vehicle, etc.). In certain configurations, a movable object (e.g., implement, tool, etc.) may be coupled to the autonomous work vehicle. In such configurations, the movable object may at least partially block a field of view of a sensor assembly of the obstacle detection system while the movable object is in certain positions. As a result, the effectiveness of the obstacle detection system may be reduced.

BRIEF DESCRIPTION

In one embodiment, an obstacle detection system for a work vehicle includes a controller having a memory and a processor. The controller is configured to receive a first signal from a first sensor assembly indicative of presence of an obstacle within a field of view of the first sensor assembly. The controller is also configured to receive a second signal from a second sensor assembly indicative of a position of the obstacle within a field of view of the second sensor assembly in response to presence of a movable object coupled to the work vehicle within the field of view of the first sensor assembly. The second sensor assembly is positioned remote from the work vehicle. In addition, the controller is configured to determine presence of the obstacle within the field of view of the first sensor assembly based on the position of the obstacle in response to receiving the second signal, and the controller is configured to output a third signal indicative of detection of the obstacle in response to presence of the obstacle within the field of view of the first sensor assembly.

In another embodiment, an obstacle detection system for a first work vehicle includes a controller having a memory and a processor. The controller is configured to receive a first signal indicative of a position of an obstacle, and the controller is configured to output a second signal to a tool control system of the first work vehicle indicative of instructions to perform an operation on the obstacle in response to receiving the first signal. In addition, the controller is configured to output a third signal to a controller of a second work vehicle indicative of the position of the obstacle and instructions to perform the operation on the obstacle in response to receiving the first signal.

In a further embodiment, one or more tangible, non-transitory, machine-readable media include instructions configured to cause a processor to receive a first signal from a first sensor assembly indicative of presence of an obstacle within a field of view of the first sensor assembly. The instructions are also configured to cause the processor to receive a second signal from a second sensor assembly indicative of a position of the obstacle within a field of view of the second sensor assembly in response to presence of a movable object coupled to the work vehicle within the field of view of the first sensor assembly. The second sensor assembly is positioned remote from the work vehicle. In addition, the instructions are configured to cause the processor to determine presence of the obstacle within the field of view of the first sensor assembly based on the position of the obstacle in response to receiving the second signal, and the controller is configured to output a third signal indicative of detection of the obstacle in response to presence of the obstacle within the field of view of the first sensor assembly.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
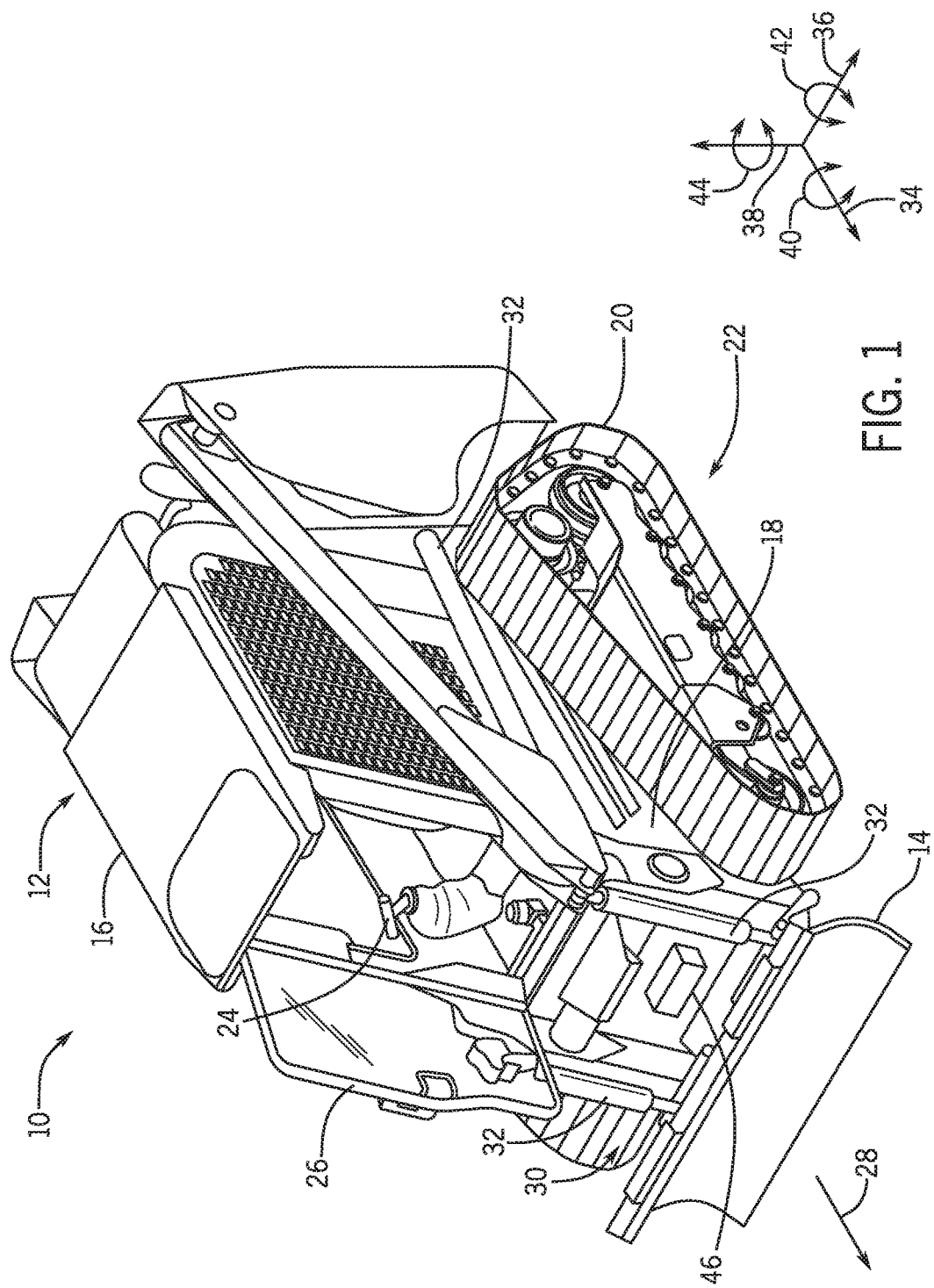
FIG. 1 is a perspective view of an embodiment of an autonomous work vehicle system including an autonomous work vehicle and a movable object coupled to the autonomous work vehicle.

FIG. 1 is a perspective view of an embodiment of an autonomous work vehicle system 10 including an autonomous work vehicle 12 and a movable object 14 (e.g., movable tool) coupled to the autonomous work vehicle 12. In the illustrated embodiment, the autonomous work vehicle 12 is a compact track loader. However, it should be appreciated that the obstacle detection system disclosed herein may be utilized on other autonomous work vehicles, such as tractors, harvesters, and construction equipment, among other autonomous work vehicles. In the illustrated embodiment, the autonomous work vehicle 12 includes a cab 16 and a chassis 18. In certain embodiments, the chassis 18 is configured to house a motor (e.g., diesel engine, etc.), a hydraulic system (e.g., including a pump, valves, a reservoir, etc.), and other components (e.g., an electrical system, a cooling system, etc.) that facilitate operation of the autonomous work vehicle system 10. In addition, the chassis 18 is configured to support the cab 16 and tracks 20 of a track system 22. The tracks 20 may be driven to rotate by a drive system that may include a hydraulic motor, a transmission, other suitable drive components, or a combination thereof.

The cab 16 is configured to house an operator of the autonomous work vehicle 12. Accordingly, various controls, such as the illustrated hand controller 24, are positioned within the cab 16 to facilitate operator control of the autonomous work vehicle 12. For example, the controls may enable the operator to control the rotational speed of the tracks 20, thereby facilitating adjustment of the speed and/or the direction of the autonomous work vehicle system 10. In the illustrated embodiment, the cab 16 includes a door 26 to facilitate ingress and egress of the operator from the cab 16.

In the illustrated embodiment, the autonomous work vehicle system 10 includes the movable tool 14, such as the illustrated dozer blade. As illustrated, the movable tool 14 is positioned forward of the chassis 18 relative to a forward direction of travel 28. In addition, the autonomous work vehicle system 10 includes an actuator assembly 30 to control a position of the movable tool 14 relative to the chassis 18. In the illustrated embodiment, the actuator assembly 30 includes hydraulic cylinders 32 configured to move the movable tool 14 relative to the chassis 18 (e.g., the illustrated lift cylinder and the illustrated back angle cylinders, among other suitable cylinder(s), such as tilt cylinder(s) and angle cylinder(s), etc.). In addition, the actuator assembly may include a valve assembly configured to control hydraulic fluid flow to the hydraulic cylinders. In certain embodiments, the actuator assembly 30 may be configured to move the movable tool 14 along a longitudinal axis 34 of the autonomous work vehicle 12, along a lateral axis 36 of the autonomous work vehicle 12, along a vertical axis 38 of the autonomous work vehicle 12, or a combination thereof. In addition, the actuator assembly 30 may be configured to rotate the movable tool 14 about the longitudinal axis 34 in roll 40, about the lateral axis 36 in pitch 42, about the vertical axis 38 in yaw 44, or a combination thereof. While the movable tool includes a dozer blade in the illustrated embodiment, in alternative embodiments the movable tool may include other suitable type(s) of tools(s) (e.g., a bucket, a broom, an auger, a grapple, etc.). In addition, while the actuator assembly includes hydraulic cylinders in the illustrated embodiment, in alternative embodiments the actuator assembly may include other suitable type(s) of actuator(s), such as hydraulic motor(s), pneumatic actuator(s), or electromechanical actuator(s), among others.

The autonomous work vehicle 12 includes a control system configured to automatically guide the autonomous work vehicle system 10 through a field (e.g., along the direction of travel 28) to facilitate various operations (e.g., earthmoving operations, etc.). For example, the control system may automatically guide the autonomous work vehicle system 10 along a route through the field without input from an operator. The control system may also automatically control movement of the movable tool based on a target operation (e.g., field leveling operation, etc.).

In the illustrated embodiment, the autonomous work vehicle 12 includes a sensor assembly 46 configured to output a signal indicative of presence and, in certain embodiments, a position of an obstacle. The sensor assembly 46 may include one or more image sensors (e.g., camera(s), etc.), one or more infrared sensors, one or more capacitance sensors, one or more ultrasonic sensors, one or more light detection and ranging (LIDAR) sensors, one or more radio detection and ranging (RADAR) sensors, or a combination thereof, among other suitable types of sensors. While the illustrated sensor assembly 46 is coupled to a front portion of the autonomous work vehicle 12 in the illustrated embodiment, in other embodiments the sensor assembly may be positioned at another suitable location on the autonomous work vehicle, or the sensor assembly may include sensors distributed throughout the autonomous work vehicle. For example, in certain embodiments, the sensor assembly may include one or more sensors coupled to a front portion of the autonomous work vehicle and one or more sensors coupled to at least one side of the autonomous work vehicle.

In certain embodiments, the sensor assembly 46 is an element of an obstacle detection system. The obstacle detection system may also include a controller configured to receive a first signal from the sensor assembly 46 indicative of presence of an obstacle within a field of view of the sensor assembly 46. In addition, the controller is configured to receive a second signal from a second sensor assembly indicative of the position of the obstacle within a field of view of the second sensor assembly in response to presence of a movable object coupled to the autonomous work vehicle (e.g., the movable tool 14) within the field of view of the sensor assembly 46. The second sensor assembly is positioned remote from the autonomous work vehicle 12 (e.g., on a second autonomous work vehicle, fixedly coupled to the field, etc.). The controller is configured to determine presence of the obstacle within the field of view of the sensor assembly 46 based on the position of the obstacle in response to receiving the second signal. In addition, the controller is configured to output a third signal indicative of detection of the obstacle in response to presence of the obstacle within the field of view of the sensor assembly 46. In certain embodiments, the third signal indicative of detection of the obstacle includes instructions to a movement control system (e.g., a speed control system and/or a steering control system) to avoid the obstacle. Because the movable object may block a portion of the field of view of the sensor assembly 46 while the movable object is within the field of view of the sensor assembly 46, utilizing the second sensor assembly to facilitate detection of an obstacle may substantially increase the effectiveness of the obstacle detection system.

Furthermore, in certain embodiments, the controller is configured to receive a first signal indicative of a position of an obstacle (e.g., from the sensor assembly 46). The controller is also configured to output a second signal to a tool control system (e.g., actuator assembly 30 and/or movement control system) indicative of instructions to perform an operation (e.g., earthmoving operation) on the obstacle in response to receiving the first signal. In addition, the controller is configured to output a third signal to a controller of a second work vehicle indicative of the position of the obstacle and instructions to perform the operation on the obstacle in response to receiving the first signal. Because the controller is configured to instruct the controller of the second work vehicle to perform the operation on the obstacle, the duration of the operation may be reduced (e.g., as compared to a single work vehicle system performing the operation).

Figure 2:
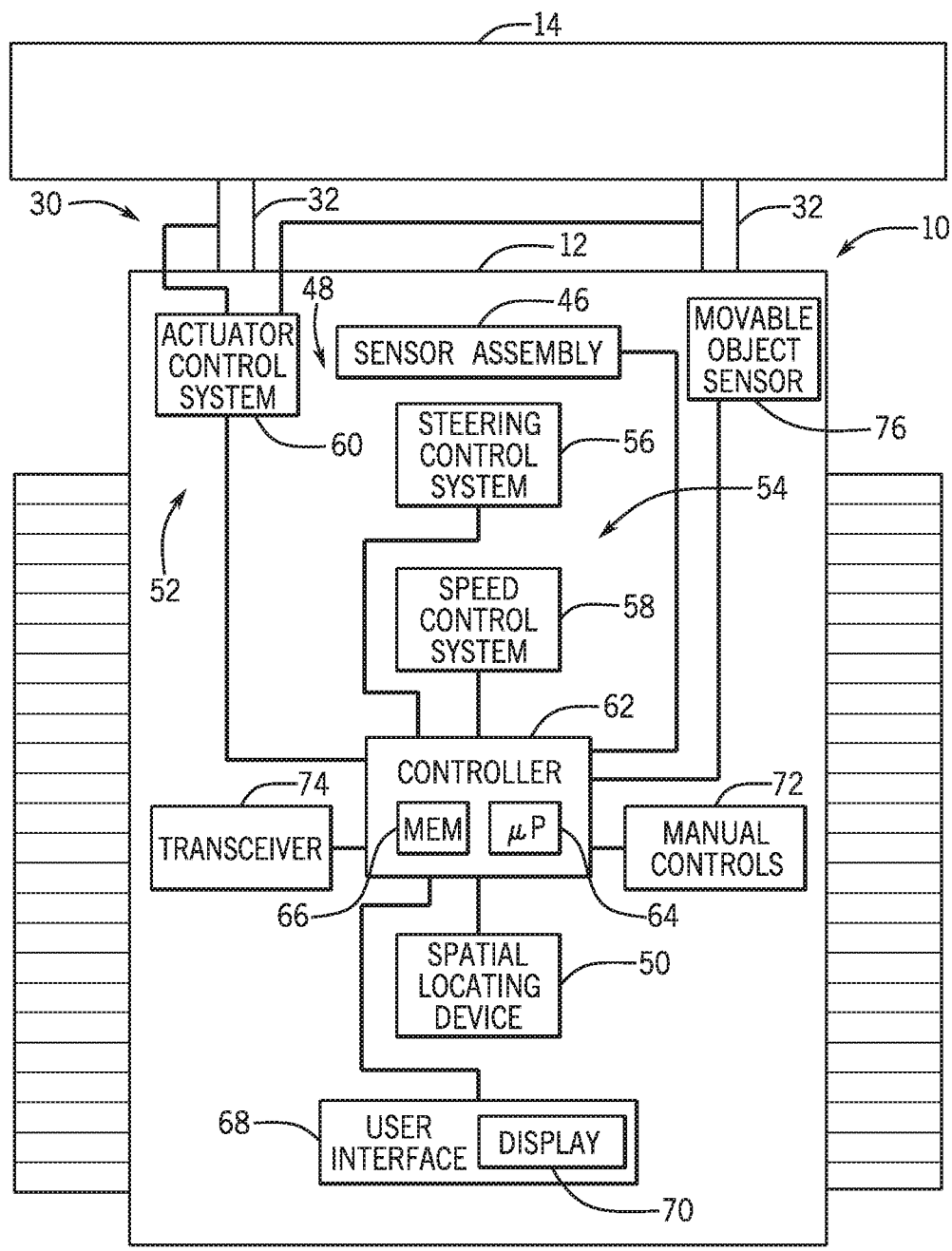
FIG. 2 is a block diagram of an embodiment of a control system that may be employed within the autonomous work vehicle system of FIG. 1.

FIG. 2 is a block diagram of an embodiment of a control system 48 (e.g., obstacle detection system) that may be employed within the autonomous work vehicle system 10 of FIG. 1. In the illustrated embodiment, the control system 48 includes a spatial locating device 50, which is mounted to the autonomous work vehicle 12 and configured to determine a position and, in certain embodiments, a velocity of the autonomous work vehicle 12. The spatial locating device 50 may include any suitable system configured to measure and/or determine the position of the autonomous work vehicle 12, such as a GPS receiver, for example.

In certain embodiments, the control system may also include an inertial measurement unit (IMU) communicatively coupled to the controller and configured to enhance the accuracy of the determined position. For example, the IMU may include one or more accelerometers configured to output signal(s) indicative of acceleration along the longitudinal axis, the lateral axis, the vertical axis, or a combination thereof. In addition, the IMU may include one or more gyroscopes configured to output signal(s) indicative of rotation (e.g., rotational angle, rotational velocity, rotational acceleration, etc.) about the longitudinal axis, the lateral axis, the vertical axis, or a combination thereof. The controller may determine the position and/or orientation of the agricultural vehicle based on the IMU signal(s), and/or the controller may utilize the IMU signal(s) to enhance the accuracy of the position determined by the spatial locating device.

In the illustrated embodiment, the control system 48 includes a tool control system 52, which includes the actuator assembly 30 and a movement control system 54. The movement control system 54 includes a steering control system 56 configured to control a direction of movement of the autonomous work vehicle 12 and a speed control system 58 configured to control a speed of the autonomous work vehicle 12. Furthermore, the actuator assembly 30 includes the actuators (e.g., hydraulic cylinders 32) and an actuator control system 60 configured to control the actuators. In addition, the control system 48 includes a controller 62, which is communicatively coupled to the spatial locating device 50, to the steering control system 56, to the speed control system 58, and to the actuator controls system 60. The controller 62 is configured to automatically control the autonomous work vehicle system during certain phases of operation (e.g., without operator input, with limited operator input, etc.).

In certain embodiments, the controller 62 is an electronic controller having electrical circuitry configured to process data from the spatial locating device 50 and/or other components of the control system 48. In the illustrated embodiment, the controller 62 include a processor, such as the illustrated microprocessor 64, and a memory device 66. The controller 62 may also include one or more storage devices and/or other suitable components. The processor 64 may be used to execute software, such as software for controlling the autonomous work vehicle system, software for determining a position of an obstacle, and so forth. Moreover, the processor 64 may include multiple microprocessors, one or more "general-purpose" microprocessors, one or more special-purpose microprocessors, and/or one or more application specific integrated circuits (ASICS), or some combination thereof. For example, the processor 64 may include one or more reduced instruction set (RISC) processors.

The memory device 66 may include a volatile memory, such as random access memory (RAM), and/or a nonvolatile memory, such as read-only memory (ROM). The memory device 66 may store a variety of information and may be used for various purposes. For example, the memory device 66 may store processor-executable instructions (e.g., firmware or software) for the processor 64 to execute, such as instructions for controlling the autonomous work vehicle system, instructions for determining a position of an obstacle, and so forth. The storage device(s) (e.g., nonvolatile storage) may include ROM, flash memory, a hard drive, or any other suitable optical, magnetic, or solid-state storage medium, or a combination thereof. The storage device(s) may store data (e.g., position data, vehicle geometry data, etc.), instructions (e.g., software or firmware for controlling the autonomous work vehicle system, etc.), and any other suitable data.

In certain embodiments, the steering control system 56 may include a wheel/track angle control system, a differential braking system, a torque vectoring system, or a combination thereof. The wheel/track angle control system may automatically rotate one or more wheels and/or tracks of the autonomous work vehicle (e.g., via hydraulic actuators) to steer the autonomous work vehicle along a target route (e.g., along a guidance swath, along headland turns, etc.). By way of example, the wheel angle control system may rotate front wheels/tracks, rear wheels/tracks, intermediate wheels/tracks, or a combination thereof, of the autonomous work vehicle (e.g., either individually or in groups). The differential braking system may independently vary the braking force on each lateral side of the autonomous work vehicle to direct the autonomous work vehicle along a path. In addition, the torque vectoring system may differentially apply torque from an engine to wheel(s) and/or track(s) on each lateral side of the autonomous work vehicle, thereby directing the autonomous work vehicle along a path. The torque vectoring system may also control output from one or more motors (e.g., hydraulic motor(s)) configured to drive wheel(s)/track(s) on each lateral side of the autonomous work vehicle in rotation. In further embodiments, the steering control system may include other and/or additional systems to facilitate directing the autonomous work vehicle along a path through the field.

In certain embodiments, the speed control system 58 may include an engine output control system, a transmission control system, a braking control system, or a combination thereof. The engine output control system may vary the output of the engine to control the speed of the autonomous work vehicle. For example, the engine output control system may vary a throttle setting of the engine, a fuel/air mixture of the engine, a timing of the engine, other suitable engine parameters to control engine output, or a combination thereof. In addition, the transmission control system may adjust a gear ratio of a transmission (e.g., by adjusting gear selection in a transmission with discrete gears, by controlling a continuously variable transmission (CVT), etc.) to control the speed of the autonomous work vehicle. Furthermore, the braking control system may adjust braking force, thereby controlling the speed of the autonomous work vehicle. In certain embodiments, the speed control system may include a valve assembly configured to control flow of hydraulic fluid to one or more hydraulic motors configured to drive the wheel(s)/track(s) in rotation. In further embodiments, the speed control system may include other and/or additional systems to facilitate adjusting the speed of the autonomous work vehicle.

In certain embodiments, the actuator control system 60 may include one or more valves configured to control a flow of fluid (e.g., hydraulic fluid) to one or more actuators 32 of the actuator assembly 30. In addition, the actuator control system 60 may include one or more sensors coupled to the one or more actuators 32. Each sensor may be configured to output a respective signal indicative of a position of the respective actuator, and the controller 62 may be configured to control the position of each actuator based at least in part on the respective signal.

In certain embodiments, the control system may also control operation of an agricultural implement coupled to (e.g., towed by) the autonomous work vehicle. For example, the control system may include an implement control system/implement controller configured to control a steering angle of the implement (e.g., via an implement steering control system having a wheel angle control system and/or a differential braking system) and/or a speed of the autonomous work vehicle system (e.g., via an implement speed control system having a braking control system). In such embodiments, the autonomous work vehicle control system may be communicatively coupled to a control system/controller on the implement via a communication network, such as a controller area network (CAN bus).

In the illustrated embodiment, the control system 48 includes a user interface 68 communicatively coupled to the controller 62. The user interface 68 is configured to enable an operator to control certain parameter(s) associated with operation of the autonomous work vehicle system. For example, the user interface 68 may include a switch that enables the operator to selectively configure the autonomous work vehicle for autonomous or manual operation. In addition, the user interface 68 may include a battery cut-off switch, an engine ignition switch, a stop button, or a combination thereof, among other controls. In certain embodiments, the user interface 68 includes a display 70 configured to present information to the operator, such as a graphical representation of a guidance swath, a visual representation of certain parameter(s) associated with operation of the autonomous work vehicle (e.g., fuel level, oil pressure, water temperature, etc.), a visual representation of certain parameter(s) associated with operation of an agricultural implement coupled to the autonomous work vehicle (e.g., seed level, penetration depth of ground engaging tools, orientation(s)/position(s) of certain components of the implement, etc.), or a combination thereof, among other information. In certain embodiments, the display 70 may include a touch screen interface that enables the operator to control certain parameters associated with operation of the autonomous work vehicle and/or the movable tool 14.

In the illustrated embodiment, the control system 48 includes manual controls 72, such as the hand controller, configured to enable an operator to control the autonomous work vehicle while automatic control is disengaged (e.g., while unloading the autonomous work vehicle from a trailer, etc.). The manual controls 72 may include manual steering control, manual transmission control, manual braking control, or a combination thereof, among other controls. In the illustrated embodiment, the manual controls 72 are communicatively coupled to the controller 62. The controller 62 is configured to disengage automatic control of the autonomous work vehicle upon receiving a signal indicative of manual control of the autonomous work vehicle. Accordingly, if an operator controls the autonomous work vehicle manually, the automatic control terminates, thereby enabling the operator to control the autonomous work vehicle.

In the illustrated embodiment, the control system 48 includes a transceiver 74 communicatively coupled to the controller 62. In certain embodiments, the transceiver 74 is configured to establish a communication link with a corresponding transceiver of a base station and/or a corresponding transceiver of another autonomous work vehicle, thereby facilitating communication between the base station/other autonomous work vehicle control system and the control system 48 of the autonomous work vehicle 12. For example, the base station may include a user interface that enables a remote operator to provide instructions to the control system 48 (e.g., instructions to initiate automatic control of the autonomous work vehicle, instructions to direct the autonomous work vehicle along a route, etc.). The user interface may also enable a remote operator to provide data to the control system. Furthermore, the transceiver 74 may enable the controller 62 to output instructions to a control system of the other autonomous work vehicle (e.g., instructions to direct the other autonomous work vehicle toward an obstacle, etc.). The transceiver 74 may operate at any suitable frequency range within the electromagnetic spectrum. For example, in certain embodiments, the transceiver 74 may broadcast and receive radio waves within a frequency range of about 1 GHz to about 10 GHz. In addition, the transceiver 74 may utilize any suitable communication protocol, such as a standard protocol (e.g., Wi-Fi, Bluetooth, etc.) or a proprietary protocol.

In certain embodiments, the control system may include other and/or additional controllers/control systems, such as the implement controller/control system discussed above. For example, the implement controller/control system may be configured to control various parameters of an agricultural implement towed by the autonomous work vehicle. In certain embodiments, the implement controller/control system may be configured to instruct actuator(s) to adjust a penetration depth of at least one ground engaging tool of the agricultural implement. By way of example, the implement controller/control system may instruct actuator(s) to reduce or increase the penetration depth of each tillage point on a tilling implement, or the implement controller/control system may instruct actuator(s) to engage or disengage each opener disc/blade of a seeding/planting implement from the soil. Furthermore, the implement controller/control system may instruct actuator(s) to transition the agricultural implement between a working position and a transport portion, to adjust a flow rate of product from the agricultural implement, or to adjust a position of a header of the agricultural implement (e.g., a harvester, etc.), among other operations. The autonomous work vehicle control system may also include controller(s)/control system(s) for electrohydraulic remote(s), power take-off shaft(s), adjustable hitch(es), or a combination thereof, among other controllers/control systems.

In the illustrated embodiment, the control system 48 includes the sensor assembly 46 communicatively coupled to the controller 62 and configured to output a signal indicative of presence and, in certain embodiments, a position of an obstacle. As previously discussed, the sensor assembly 46 may include one or more image sensors (e.g., camera(s), etc.), one or more infrared sensors, one or more capacitance sensors, one or more ultrasonic sensors, one or more LIDAR sensors, one or more RADAR sensors, or a combination thereof, among other suitable types of sensors. In certain embodiments, the controller 62 is configured to receive a first signal from the sensor assembly 46 indicative of presence of an obstacle within a field of view of the sensor assembly 46. The controller 62 is also configured to receive a second signal from a second sensor assembly (e.g., via the transceiver 74) indicative of a position of the obstacle within a field of view of the second sensor assembly in response to presence of the movable tool 14 within the field of view of the sensor assembly 46. As discussed in detail below, the second sensor assembly is positioned remote from the autonomous work vehicle 12 (e.g., on another autonomous work vehicle, fixedly coupled to the field, etc.). In addition, the controller 62 is configured to determine presence of the obstacle within the field of view of the first sensor assembly based on the position of the obstacle in response to receiving the second signal. Furthermore, the controller is configured to output a third signal indicative of detection of the obstacle in response to presence of the obstacle within the field of view of the first sensor assembly.

In certain embodiments, the third signal indicative of detection of the obstacle includes instructions to the movement control system 54 to avoid the obstacle (e.g., if the obstacle is positioned along a path of the autonomous work vehicle system 10). For example, the controller 62 may output the third signal to the steering control system 56 indicative of instructions to steer the autonomous work vehicle system 10 around the obstacle. In addition, the controller 62 may output the third signal to the speed control system 58 indicative of instructions to stop the autonomous work vehicle system 10 or reduce the speed of the autonomous work vehicle system 10 to avoid a moving obstacle.

In the illustrated embodiment, the control system 48 includes a movable object sensor 76 communicatively coupled to the controller 62 and configured to output a signal indicative of the position of the movable object (e.g., movable tool 14) relative to the autonomous work vehicle 12. In certain embodiments, the movable object sensor 76 may include a potentiometer, an ultrasonic sensor, an infrared sensor, an image sensor, a capacitance sensor, or a combination thereof, among other suitable types of sensors. For example, the movable object sensor may be configured to output a signal indicative of an angle of the movable tool 14 relative to the autonomous work vehicle. The controller 62 may be configured to determine the position of the movable tool 14 based at least in part on the dimensions of the movable tool, the mounting location of the movable tool on the autonomous work vehicle, and the angle of the movable tool relative to the autonomous work vehicle. Accordingly, the controller may identify presence of the movable tool within the field of view of the sensor assembly based at least in part on the position of the movable tool. The movable object sensor may also enable the controller to determine the position of other movable objects coupled to the autonomous work vehicle (e.g., an agricultural implement towed by the autonomous work vehicle), thereby enabling the controller to identify presence of the movable object within the field of view of the sensor assembly. In certain embodiments, the position of the movable object (e.g., agricultural implement) may be determined based on steering angle of the autonomous work vehicle (e.g., instead of utilizing the movable object sensor).

In certain embodiments, the controller 62 is configured to receive a first signal (e.g., from the sensor assembly 46) indicative of a position of an obstacle. The controller 62 is also configured to output a second signal to the tool control system 52 indicative of instructions to perform an operation on the obstacle (e.g., earthmoving operation) in response to receiving the first signal. In addition, the controller is configured to output a third signal (e.g., via the transceiver 74) to a controller of a second autonomous work vehicle indicative of the position of the obstacle and instructions to perform the operation on the obstacle in response to receiving the first signal. In certain embodiments, the controller 62 is configured to determine whether an identity of the obstacle corresponds to a target identity (e.g., stored within the memory device 66 and/or the storage device of the controller 62) in response to receiving the first signal. In such embodiments, the controller 62 is configured to only output the second and third signals in response to determining that the identity of the obstacle corresponds to the target identity.

Figure 3:
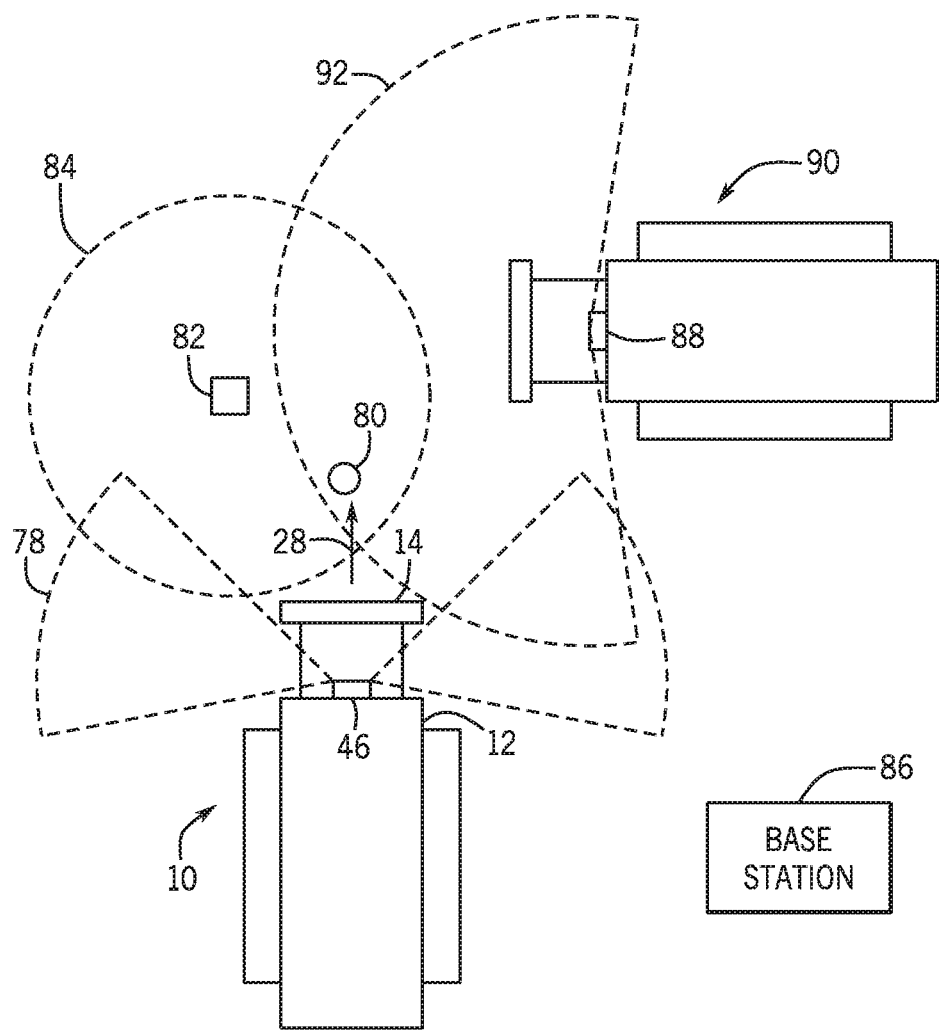
FIG. 3 is a schematic diagram of an embodiment of the autonomous work vehicle system of FIG. 1, in which the movable object is in a field of view of a sensor assembly.

FIG. 3 is a schematic diagram of an embodiment of the autonomous work vehicle system 10 of FIG. 1, in which the movable tool 14 is in a field of view 78 of the sensor assembly 46. As illustrated, with the movable tool 14 in the field of view 78 of the sensor assembly 46, the movable tool 14 blocks a portion of the field of view 78. For example, the sensor assembly 46 may be positioned at a height on the front portion of the autonomous work vehicle 12 that enables the sensor assembly 46 to detect obstacles in front of the autonomous work vehicle system 10 while the movable tool 14 is in a lowered position. However, when the movable tool 14 is in a raised position, the movable tool 14 may block a portion of the field of view 78. Accordingly, an obstacle 80 that is positioned in front of the autonomous work vehicle system 10 along the direction of travel 28 may not be detectable by the sensor assembly 46. As used herein, "field of view" refers to the field of view of the sensor assembly with the movable object/tool in a default position (e.g., lowered position), in a least obstructing position, or in a non-obstructing position. Accordingly, moving the movable object/tool from the default/least obstructing/non-obstructing position brings the movable object/tool into the field of view of the sensor assembly.

In the illustrated embodiment, the controller of the autonomous work vehicle system 10 is configured to receive a signal from another sensor assembly indicative of a position of the obstacle 80 within the field of view of the other sensor assembly in response to presence of the movable tool 14 within the field of view 78 of the sensor assembly 46. As previously discussed, the controller may determine that the movable tool 14 is within the field of view 78 of the sensor assembly 46 based on feedback from a movable object sensor. In addition or alternatively, the controller may determine that the movable tool 14 is within the field of view 78 of the sensor assembly 46 based on feedback from the sensor assembly 46. For example, the controller may compare the size, shape, position, or a combination thereof, of the object within the field of view 78 of the sensor assembly 46 to the respective properties of the movable tool 14 (e.g., stored within the memory device and/or the storage device of the controller). Upon determining that the movable tool 14 is within the field of view 78 of the sensor assembly 46, the controller may receive the signal from the other sensor assembly indicative of the position of the obstacle 80.

In certain embodiments, the other sensor assembly 82 may be fixedly coupled to the field (e.g., infrastructure sensor assembly). The infrastructure sensor assembly 82 may include one or more image sensors (e.g., camera(s), etc.), one or more infrared sensors, one or more capacitance sensors, one or more ultrasonic sensors, one or more LIDAR sensors, one or more RADAR sensors, or a combination thereof, among other suitable types of sensors. As illustrated, the obstacle 80 is within the field of view 84 of the infrastructure sensor assembly 82. Accordingly, the infrastructure sensor assembly 82 outputs a signal indicative of the position of the obstacle 80. In certain embodiments, the controller of the autonomous work vehicle system 10 may receive the signal directly from the infrastructure sensor assembly 82 (e.g., via the transceiver of the autonomous work vehicle 10 and a corresponding transceiver of the infrastructure sensor assembly 82). However, in other embodiments, the infrastructure sensor assembly 82 may output the signal to a base station 86, and the controller may receive the signal indicative of the position of the obstacle from the base station 86 (e.g., via the transceiver of the autonomous work vehicle system 10 and a transceiver of the base station).

In certain embodiments, the other sensor assembly is a second sensor assembly 88 of a second work vehicle system 90 (e.g., second autonomous work vehicle system). For example, the second sensor assembly 88 may be coupled to the autonomous work vehicle of the second autonomous work vehicle system 90. The second sensor assembly 88 may include one or more image sensors (e.g., camera(s), etc.), one or more infrared sensors, one or more capacitance sensors, one or more ultrasonic sensors, one or more LIDAR sensors, one or more RADAR sensors, or a combination thereof, among other suitable types of sensors. As illustrated, the obstacle 80 is within the field of view 92 of the second sensor assembly 88. Accordingly, the second sensor assembly 88 outputs a signal indicative of the position of the obstacle (e.g., to the controller of the second autonomous work vehicle system 90). In certain embodiments, the controller of the autonomous work vehicle system 10 may receive the signal directly from the controller of the second autonomous work vehicle system 90 (e.g., via transceivers of the respective work vehicles). However, in other embodiments, the controller of the second autonomous work vehicle system 90 may output the signal to the base station 86, and the controller of the autonomous work vehicle system 10 may receive the signal indicative of the position of the obstacle from the base station 86 (e.g., via the transceiver of the autonomous work vehicle system 10 and the transceiver of the base station).

In response to receiving the signal indicative of the position of the obstacle 80 from the infrastructure sensor assembly 82 and/or from the second sensor assembly 88 of the second autonomous work vehicle system 90, presence of the obstacle within the field of view of the first sensor assembly is determined. For example, the controller of the autonomous work vehicle system 10 may compare the position of the obstacle to the position of the field of view 78. If the positions overlap, the controller determines that the obstacle 80 is present within the field of view 78 of the sensor assembly 46. In addition, if the movable tool 14 is not present within the field of view 78 of the sensor assembly 46, the controller determines whether the obstacle 80 is present within the field of view 78 based on a signal from the sensor assembly 46.

Upon determining that the obstacle 80 is present within the field of view 78, the controller may output a signal indicative of detection of the obstacle 80. The signal indicative of detection of the obstacle may include instructions to inform an operator (e.g., via the user interface) of the presence and, in certain embodiments, position of the obstacle. In addition, if the position of the obstacle 80 is within a path of the autonomous work vehicle system, the signal indicative of detection of the obstacle may include instructions to the movement control system to avoid the obstacle. For example, the instructions may include instructions to the speed control system to stop the autonomous work vehicle, or the instructions may include instructions to the steering control system to direct the autonomous work vehicle system around the obstacle (e.g., in combination with instructions to the speed control system to reduce the speed of the autonomous work vehicle).

Figure 4:
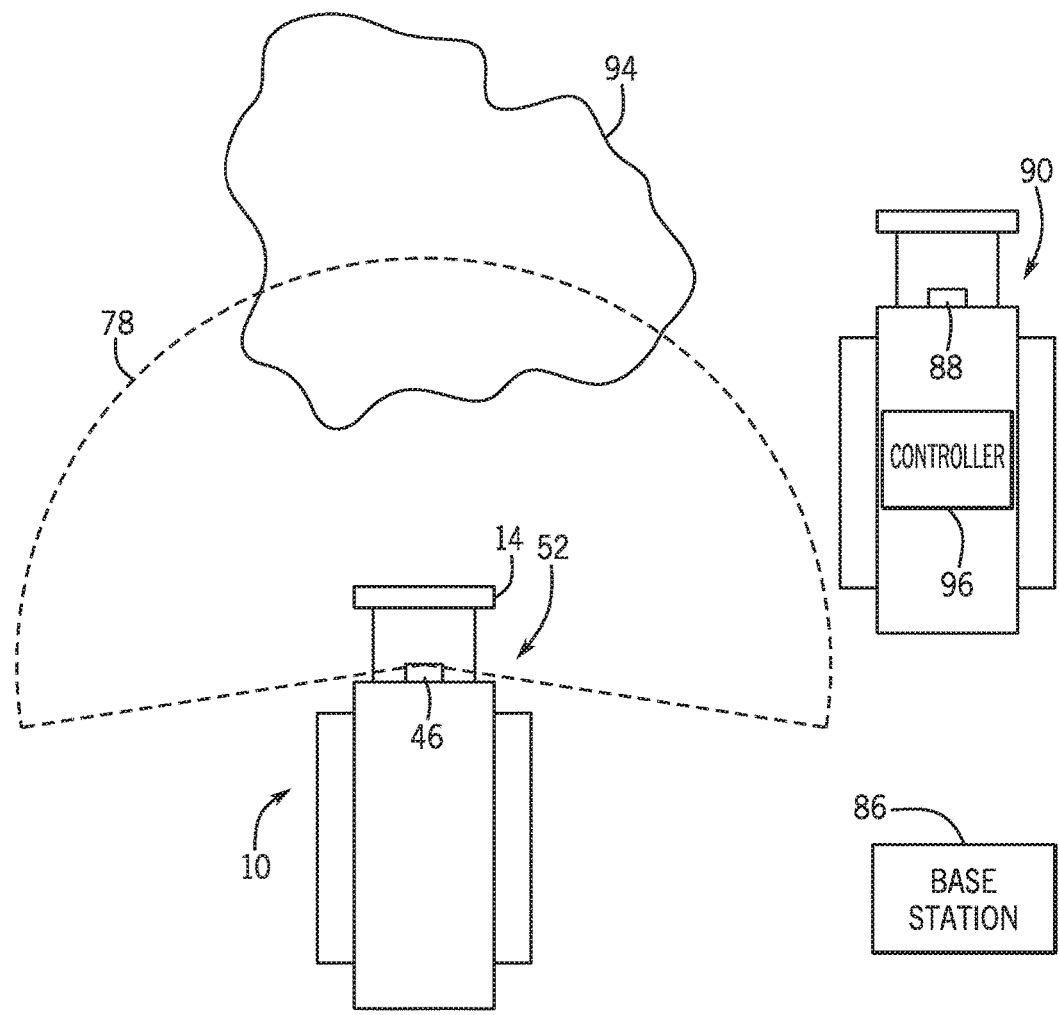
FIG. 4 is a schematic diagram of an embodiment of the autonomous work vehicle system of FIG. 1, in which an obstacle is within the field of view of the sensor assembly.

FIG. 4 is a schematic diagram of an embodiment of the autonomous work vehicle system 10 of FIG. 1, in which an obstacle 94 is within the field of view 78 of the sensor assembly 46. In certain embodiments, the controller of the autonomous work vehicle system 10 (e.g., first autonomous work vehicle system) is configured to receive a first signal indicative of a position of the obstacle 94 (e.g., from the sensor assembly 46). The obstacle may be a mound of soil, a trench within the field, or any other feature suitable for earthmoving operations. The controller of the first autonomous work vehicle system 10 is configured to output a second signal to the tool control system 52 indicative of instructions to perform an operation on the obstacle 94 in response to receiving the first signal. For example, the operation may include an earthmoving operation, such as leveling the mound of soil or filling the trench with soil. In addition, the controller of the first autonomous work vehicle system 10, in response to receiving the first signal, is configured to output a third signal to a controller 96 of the second autonomous work vehicle system 90 indicative of the position of the obstacle and instructions to perform the operation on the obstacle 94. The controller 96 of the second autonomous work vehicle system 90 may receive the third signal. The controller 96 may then instruct a tool control system of the second autonomous work vehicle system 90 to direct the second autonomous work vehicle system 90 toward the obstacle 94 (e.g., via the movement control system) and to perform the operation (e.g., via the actuator assembly and/or the movement control system).

In certain embodiments, the controller of the first autonomous work vehicle system 10 may output the third signal directly to the controller 96 of the second autonomous work vehicle system 90 (e.g., via transceivers of the respective autonomous work vehicles). However, in other embodiments, the controller of the first autonomous work vehicle system 10 may output the third signal to the base station 86, and the controller 96 of the second autonomous work vehicle system 90 may receive the third signal indicative of the position of the obstacle 94 and instructions to perform the operation on the obstacle 94 from the base station 86 (e.g., via the transceiver of the second autonomous work vehicle system 90 and the transceiver of the base station 86). Because two autonomous work vehicle systems perform the operation, the duration of the operation may be reduced (e.g., as compared to a single work vehicle system performing the operation).

In certain embodiments, the controller of the first autonomous work vehicle system 10 is configured to determine whether an identity of the obstacle 94 corresponds to a target identity in response to receiving the first signal. In such embodiments, the controller of the first autonomous work vehicle system 10 is configured to only output the second and third signals in response to determining that the identity of the obstacle corresponds to the target identity. For example, the obstacle identification process may include comparing the data received from the sensor assembly 46 to data stored within the memory and/or storage device of the first autonomous work vehicle system controller (e.g., associated with various types of objects). If the identity of the obstacle corresponds to the target identity (e.g., a mound of soil, a trench within the soil, etc.), the controller of the first autonomous work vehicle system 10 may output the second and third signals. However, if the identity of the obstacle corresponds to another type of obstacle (e.g., livestock in the field, a tree within the field, etc.), the controller may not output the second and third signals.

While the illustrated embodiment includes two autonomous work vehicle systems, in other embodiments more autonomous work vehicle systems may be distributed throughout the field. In such embodiments, the controller of the first autonomous work vehicle system 10 may output the third signal to all of the other autonomous work vehicle systems, or a selected subset of the autonomous work vehicle systems. Furthermore, in certain embodiments, a controller of the base station 86 may determine which autonomous work vehicle systems receive the third signal (e.g., in embodiments in which the third signal is relayed through the base station). Furthermore, while the autonomous work vehicle systems are configured to perform an earthmoving operation in the illustrated embodiment, in other embodiments the autonomous work vehicle systems may be configured to perform other operations, such as agricultural operations (e.g., in which the obstacle is an unharvested portion of the field, etc.).

Figure 5:
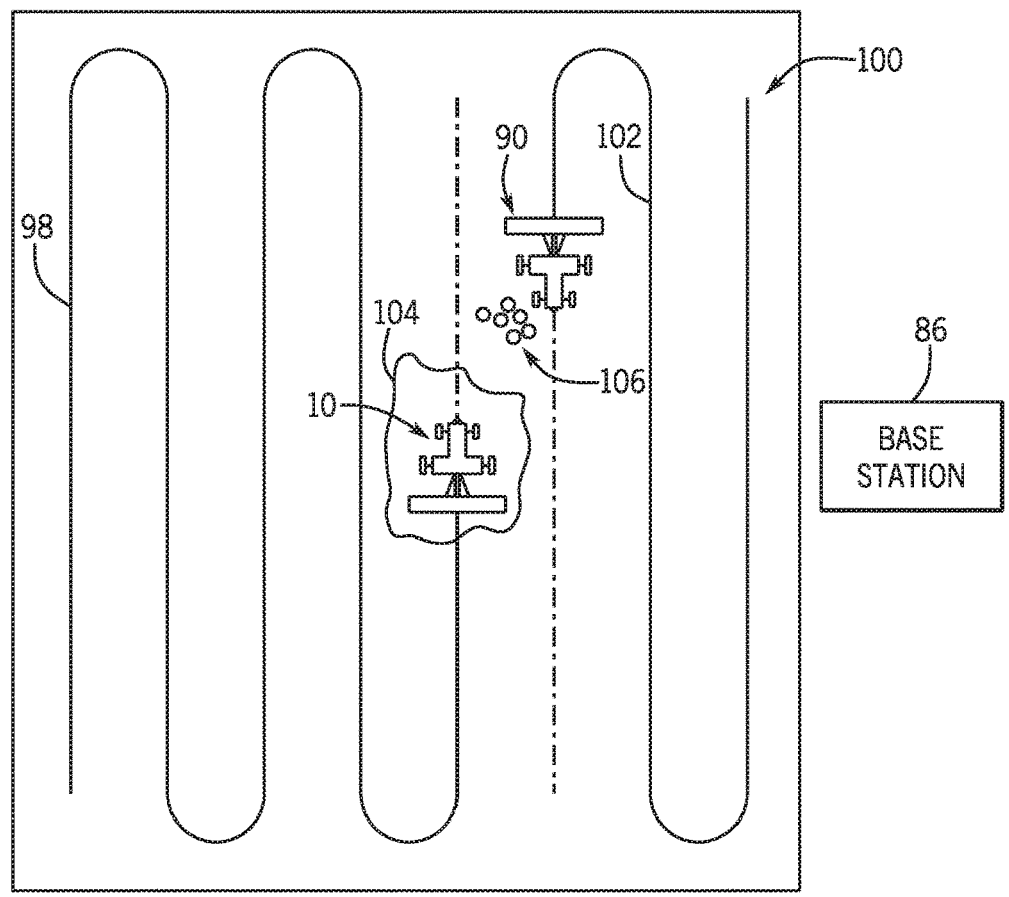
FIG. 5 is a schematic diagram of an embodiment of the autonomous work vehicle system of FIG. 1 and a second autonomous work vehicle system within a field.

FIG. 5 is a schematic diagram of an embodiment of the autonomous work vehicle system 10 of FIG. 1 (e.g., the first autonomous work vehicle system 10) and the second autonomous work vehicle system 90 within a field. In certain embodiments, the controller of the first autonomous work vehicle system 10 is configured to output a signal to the movement control system (e.g., the speed control system and/or the steering control system) indicative of instructions to direct the first autonomous work vehicle system 10 along a first route 98 through the field 100. In addition, the controller of the second autonomous work vehicle system 90 is configured to output a signal to the respective movement control system (e.g., the speed control system and/or the steering control system) indicative of instructions to direct the second autonomous work vehicle system 90 along a second route 102 through the field 100. The first and second routes may be based on a plan to perform an agricultural operation (e.g., tillage, planting, harvesting, etc.) on the field 100. For example, the controller of the base station 86 may determine the plan, and then output signals indicative of the first and second routes to the controllers of the autonomous work vehicle systems. In addition or alternatively, the autonomous work vehicle system controllers may output signals indicative of the respective routes to one another (e.g., in which the routes are based on the plan). While two autonomous work vehicle systems are positioned within the field in the illustrated embodiment, in alternative embodiments more autonomous work vehicle systems may be positioned within the field (e.g., each receiving a respective route based on the plan).

As illustrated, the first autonomous work vehicle system 10 is positioned within a region 104 of the field 100 having a rough and/or low traction surface. For example, the first autonomous work vehicle system 10 may detect a rough surface based on data received from the sensor assembly and/or data received from an accelerometer mounted to the first autonomous work vehicle system 10. Upon detection of the rough surface, the controller of the first autonomous work vehicle system 10 may instruct the movement control system to reduce the speed of the autonomous work vehicle system (e.g., via the speed control system), and/or the controller may instruct the movement control system to direct the first autonomous work vehicle system 10 around the region 104 (e.g., via the steering control system). In addition, the first autonomous work vehicle system 10 may detect a low traction surface based on data received from the sensor assembly and/or data received from wheel speed sensors, for example. Upon detection of the low traction surface, the controller of the first autonomous work vehicle system 10 may instruct the movement control system to reduce the speed of the autonomous work vehicle system (e.g., via the speed control system), engage a differential locking system, engage a four-wheel drive system, instruct the movement control system to direct the first autonomous work vehicle system around the region 104, or a combination thereof.

In addition, upon detection of the rough and/or low traction region, the controller of the first autonomous work vehicle system 10 may output a signal to the controller of the second autonomous work vehicle system 90 (e.g., via respective transceivers, via the base station controller, etc.) indicative of presence and, in certain embodiments, position of the rough and/or low traction region. In certain embodiments, the signal includes information regarding the type of surface (e.g., rough and/or low traction). Upon receiving the signal, the controller of the second autonomous work vehicle system 90 may instruct the movement control system, the differential locking system, the four-wheel drive system, or a combination thereof, to respond accordingly (e.g., upon reaching the region 104 or before reaching the region 104). For example, the controller of the second autonomous work vehicle system 90 may instruct the movement control system to reduce the speed of the autonomous work vehicle system (e.g., via the speed control system), engage a differential locking system, engage a four-wheel drive system, instruct the movement control system to direct the second autonomous work vehicle system around the region 104 (e.g., via the steering control system), or a combination thereof. Because the second autonomous work vehicle system 90 may respond to the rough and/or low traction surface before reaching the region 104 or at the boundary of the region 104, the efficiency of the agricultural operations may be enhanced.

Furthermore, as illustrated, an obstacle, such as the illustrated herd of cows 106, is positioned along the path of the second autonomous work vehicle system 90. Upon detection of the herd of cows 106, the controller of the second autonomous work vehicle system 90 may instruct the speed control system to stop the autonomous work vehicle system, or the controller may instruct the steering control system to direct the second autonomous work vehicle system 90 around the herd of cows 106 (e.g., in combination with instructions to the speed control system to reduce the speed of the autonomous work vehicle system). In addition, upon detection of the herd of cows, the controller of the second autonomous work vehicle system 90 may output a signal to the controller of the first autonomous work vehicle system 10 (e.g., via respective transceivers, via the base station controller, etc.) indicative of presence and, in certain embodiments, position and/or velocity of the herd of cows. In certain embodiments, the signal includes information regarding the type of obstacle (e.g., the herd of cows 106). Upon receiving the signal, the controller of the first autonomous work vehicle system 10 may instruct the speed control system to stop the autonomous work vehicle system or reduce the speed of the autonomous work vehicle system to avoid the encounter with the herd of cows (e.g., based on the velocity of the herd), or the controller may instruct the steering control system to direct the first autonomous work vehicle system 10 around the herd of cows 106 (e.g., in combination with instructions to the speed control system to reduce the speed of the autonomous work vehicle system). Because the first autonomous work vehicle system 10 may respond to the herd of cows 106 before reaching the herd of cows, the efficiency of the agricultural operations may be enhanced.

While a herd of cows is disclosed above, the obstacle detection system may be utilized for other types of obstacles, such as stationary obstacle (e.g., trees, posts, etc.) and/or moving obstacle (e.g., vehicles, other animals, etc.). In addition, in certain embodiments, a map of the field (e.g., stored on the base station controller) may be updated to include the detected obstacles and/or the soil conditions. In such embodiments, the map may be used for subsequent agricultural operations. Furthermore, in certain embodiments, obstacles and/or the soil conditions may be detected by sensor assemblies positioned remote from the autonomous work vehicle systems, such as infrastructure sensor assemblies and/or sensor assemblies mounted on other vehicles within the field.

Figure 6:
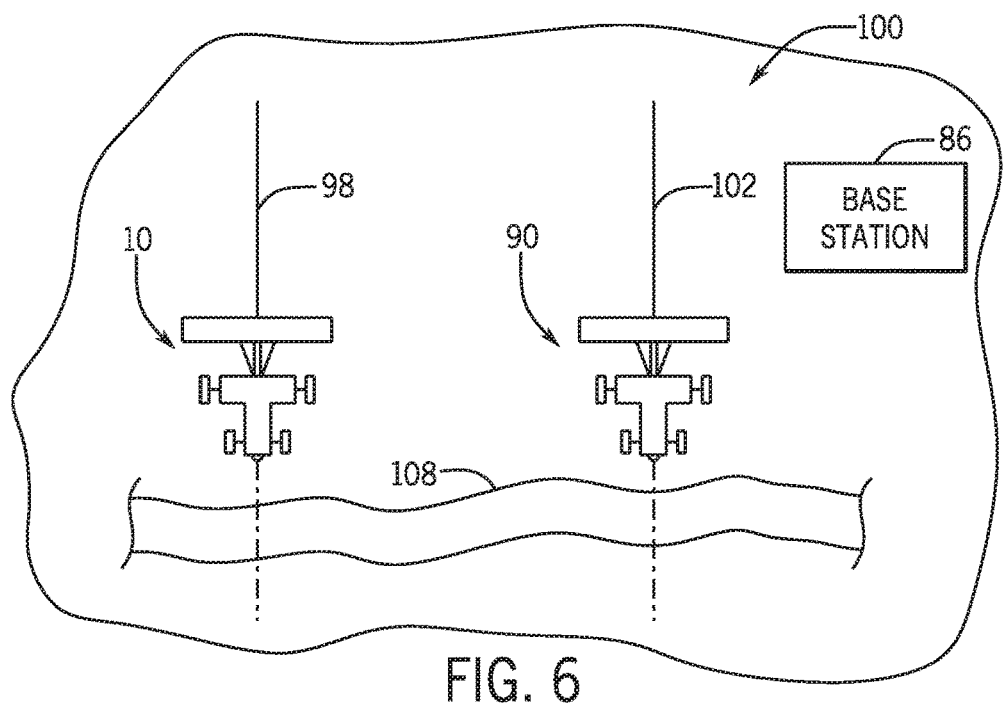
FIG. 6 is a schematic diagram of an embodiment of the autonomous work vehicle system of FIG. 1 and the second autonomous work vehicle system of FIG. 5 approaching a trench within the field.

FIG. 6 is a schematic diagram of an embodiment of the autonomous work vehicle system 10 of FIG. 1 (e.g., the first autonomous work vehicle system 10) and the second autonomous work vehicle system 90 of FIG. 5 approaching a trench 108 within the field 100. The sensor assembly of the first autonomous work vehicle system 10 may output a signal indicative of presence and, in certain embodiments, position of the trench 108. The controller of the first autonomous work vehicle system 10 may receive the signal and instruct the movement control system to respond accordingly. For example, the controller of the first autonomous work vehicle system 10 may instruct the movement control system to reduce the speed of the autonomous work vehicle system (e.g., via the speed control system), engage a differential locking system, engage a four-wheel drive system, instruct the movement control system to direct the first autonomous work vehicle system around the trench 108 (e.g., via the steering control system), or a combination thereof. In addition, in certain embodiments, the controller of the first autonomous work vehicle system 10 may update a map of the field (e.g., stored on the base station controller) based on data from the sensor assembly.

Furthermore, the sensor assembly of the second autonomous work vehicle system 90 may output a signal indicative of presence and, in certain embodiments, position of the trench 108. The controller of the second autonomous work vehicle system 90 may receive the signal and instruct the movement control system to respond accordingly. For example, the controller of the second autonomous work vehicle system 90 may instruct the movement control system to reduce the speed of the autonomous work vehicle system (e.g., via the speed control system), engage a differential locking system, engage a four-wheel drive system, instruct the movement control system to direct the second autonomous work vehicle system around the trench 108 (e.g., via the steering control system), or a combination thereof. In addition, in certain embodiments, the controller of the second autonomous work vehicle system 90 may update a map of the field (e.g., stored on the base station controller) based on data from the sensor assembly. Because the controllers of both autonomous work vehicle systems may update the map, the accuracy of the map may be enhanced (e.g., as compared to a map updated using data from a single autonomous work vehicle system). For example, the sensor assemblies of the autonomous work vehicle systems may output data associated with various portions of the trench 108, and/or the sensor assemblies of the autonomous work vehicle systems may view the trench 108 from various angles, thereby enhancing the accuracy the map. While the autonomous work vehicle systems are approaching a trench in the illustrated embodiment, the autonomous work vehicle systems may approach other obstacles in further embodiments. In such embodiments, the controllers of the autonomous work vehicle systems may update the map accordingly.

Figure 7:
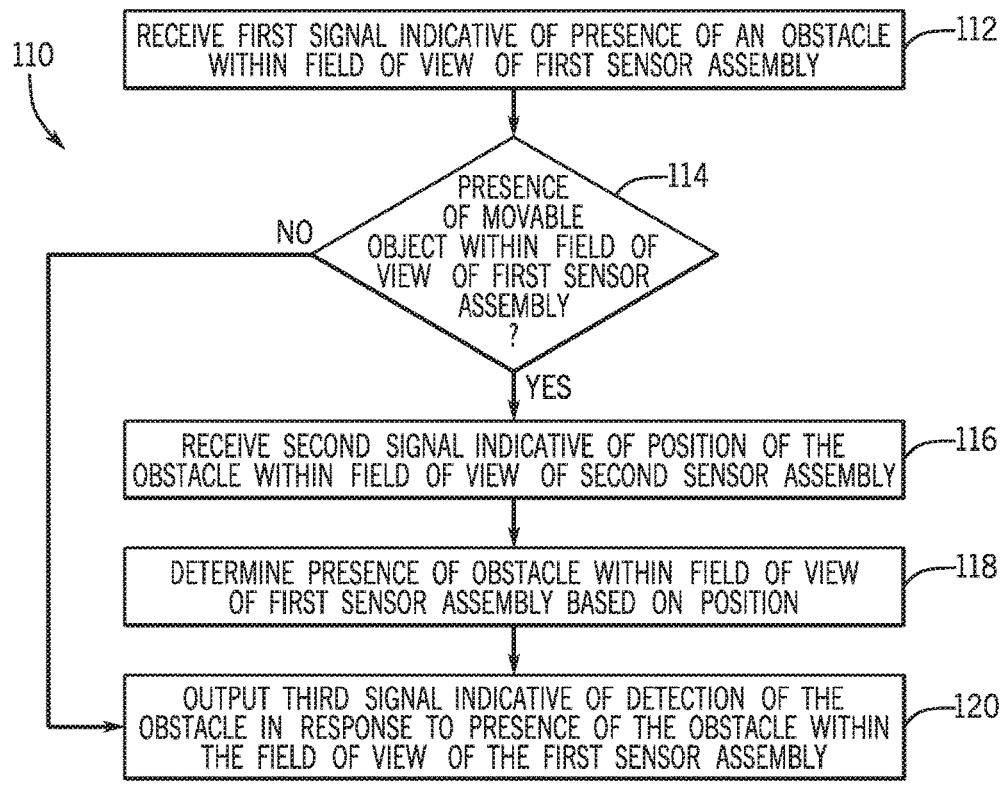
FIG. 7 is a flow diagram of an embodiment of a method for detecting an obstacle.

FIG. 7 is a flow diagram of an embodiment of a method 110 for detecting an obstacle. First, as represented by block 112, a first signal indicative of presence of an obstacle within a field of view of a first sensor assembly is received from the first sensor assembly. Next, a determination is made regarding whether a movable object (e.g., movable tool) coupled to the autonomous work vehicle is present within the field of view of the first sensor assembly, as represented by block 114. If the movable object is present within the field of view of the first sensor assembly, a second signal indicative of a position of the obstacle within a field of view of a second sensor assembly is received from the second sensor assembly, as represented by block 116. The second sensor assembly is positioned remote from the first sensor assembly. For example, the second sensor assembly may be coupled to a second autonomous work vehicle, or the second sensor assembly may be fixedly coupled to a field. In response to receiving the second signal, presence of the obstacle within the field of view of the first sensor assembly is determined based on the position of the obstacle, as represented by block 118. As represented by block 120, a third signal indicative of detection of the obstacle is output in response to presence of the obstacle within the field of view of the first sensor assembly. For example, the third signal may include instructions to a movement control system (e.g., speed control system and/or steering control system) to avoid the obstacle.

Figure 8:
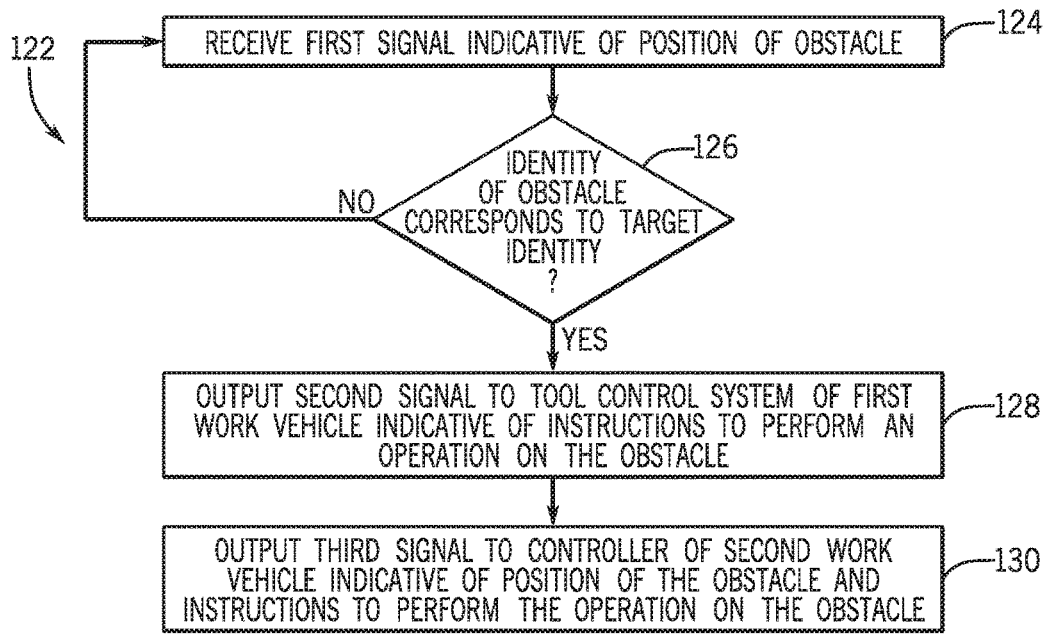
FIG. 8 is a flow diagram of another embodiment of a method for detecting an obstacle.

FIG. 8 is a flow diagram of another embodiment of a method 122 for detecting an obstacle. First, as represented by block 124, a first signal indicative of a position of an obstacle is received (e.g., from the sensor assembly). Next, a determination is made regarding whether an identity of the obstacle corresponds to a target identity, as represented by block 126. If the identity of the obstacle does not correspond to the target identity, the method returns to block 124. Otherwise, a second signal indicative of instructions to perform an operation on the obstacle is output to a tool control system of the first autonomous work vehicle, as represented by block 128. For example, the tool control system may include an actuator assembly and/or a movement control system (e.g., a steering control system and/or a speed control system). As represented by block 130, a third signal indicative of the position of the obstacle and instructions to perform the operation on the obstacle is output to a controller of a second autonomous work vehicle. The controller of the second autonomous work vehicle, in turn, may be configured to instruct a tool control system of the second autonomous work vehicle to perform the operation on the obstacle.

While the obstacle detection system is disclosed above with reference to an autonomous work vehicle, the obstacle detection system may be utilized in other types of work vehicles (e.g., semi-autonomous work vehicles, manually controlled work vehicles, etc.). Furthermore, the obstacle detection system disclosed herein may be configured to perform any or all of the functions disclosed in the embodiments above.

While only certain features have been illustrated and described herein, many modifications and changes will occur to those skilled in the art. It is, therefore, to be understood that the appended claims are intended to cover all such modifications and changes as fall within the true spirit of the disclosure.

The invention claimed is:

1. An obstacle detection system for a work vehicle, comprising:
   a controller comprising a memory and a processor, wherein the controller is configured to:
   receive a first signal from a first sensor assembly indicative of presence of an obstacle within a field of view of the first sensor assembly;
   receive a second signal from a second sensor assembly indicative of a position of the obstacle within a field of view of the second sensor assembly in response to presence of a movable object coupled to the work vehicle within the field of view of the first sensor assembly, wherein the second sensor assembly is positioned remote from the work vehicle;
determine presence of the obstacle within the field of view of the first sensor assembly based on the position of the obstacle in response to receiving the second signal; and
output a third signal indicative of detection of the obstacle in response to presence of the obstacle within the field of view of the first sensor assembly.

2. The obstacle detection system of claim 1, wherein the movable object comprises a tool rotatably coupled to the work vehicle.

3. The obstacle detection system of claim 1, wherein the second sensor assembly is coupled to a second work vehicle.

4. The obstacle detection system of claim 1, wherein the second sensor assembly is fixedly coupled to a field.

5. The obstacle detection system of claim 1, comprising the first sensor assembly communicatively coupled to the controller, wherein the first sensor assembly is configured to output the first signal.

6. The obstacle detection system of claim 5, wherein the first sensor assembly comprises an image sensor, an infrared sensor, a capacitance sensor, an ultrasonic sensor, a light detection and ranging (LIDAR) sensor, a radio detection and ranging (RADAR) sensor, or a combination thereof.

7. The obstacle detection system of claim 1, wherein the third signal indicative of detection of the obstacle comprises instructions to a movement control system of the work vehicle to avoid the obstacle.

8. The obstacle detection system of claim 7, wherein the movement control system comprises a speed control system, a steering control system, or a combination thereof.

9. An obstacle detection system for a first work vehicle, comprising:
a controller comprising a memory and a processor, wherein the controller is configured to:
receive a first signal indicative of a position of an obstacle;
output a second signal to a tool control system of the first work vehicle indicative of instructions to perform an operation on the obstacle in response to receiving the first signal; and
output a third signal to a controller of a second work vehicle indicative of the position of the obstacle and instructions to perform the operation on the obstacle in response to receiving the first signal.

10. The obstacle detection system of claim 9, wherein the operation comprises an earthmoving operation.

11. The obstacle detection system of claim 9, comprising a sensor assembly communicatively coupled to the controller, wherein the first signal indicative of the position of the obstacle is output by the sensor assembly.

12. The obstacle detection system of claim 11, wherein the sensor assembly comprises an image sensor, an infrared sensor, a capacitance sensor, an ultrasonic sensor, a light detection and ranging (LIDAR) sensor, a radio detection and ranging (RADAR) sensor, or a combination thereof.

13. The obstacle detection system of claim 9, wherein the tool control system of the first work vehicle comprises an actuator assembly configured to control a position of a tool, a movement control system of the first work vehicle, or a combination thereof.

14. The obstacle detection system of claim 9, wherein the controller is configured to determine whether an identity of the obstacle corresponds to a target identity in response to receiving the first signal, and the control is configured to only output the second and third signals in response to determining that the identity of the obstacle corresponds to the target identity.

15. One or more tangible, non-transitory, machine-readable media comprising instructions configured to cause a processor to:
receive a first signal from a first sensor assembly indicative of presence of an obstacle within a field of view of the first sensor assembly;
receive a second signal from a second sensor assembly indicative of a position of the obstacle within a field of view of the second sensor assembly in response to presence of a movable object coupled to the work vehicle within the field of view of the first sensor assembly, wherein the second sensor assembly is positioned remote from the work vehicle;
determine presence of the obstacle within the field of view of the first sensor assembly based on the position of the obstacle in response to receiving the second signal;
output a third signal indicative of detection of the obstacle in response to presence of the obstacle within the field of view of the first sensor assembly.

16. The one or more tangible, non-transitory, machine-readable media of claim 15, wherein the movable object comprises a tool rotatably coupled to the work vehicle.

17. The one or more tangible, non-transitory, machine-readable media of claim 15, wherein the second sensor assembly is coupled to a second work vehicle.

18. The one or more tangible, non-transitory, machine-readable media of claim 15, wherein the second sensor assembly is fixedly coupled to a field.

19. The one or more tangible, non-transitory, machine-readable media of claim 15, wherein the third signal indicative of detection of the obstacle comprises instructions to a movement control system of the work vehicle to avoid the obstacle.

20. The one or more tangible, non-transitory, machine-readable media of claim 19, wherein the movement control system comprises a speed control system, a steering control system, or a combination thereof.

* * * * *